June 7, 1938.  C. D. KNOWLTON  2,119,585

FEEDING APPARATUS

Original Filed July 7, 1930  2 Sheets—Sheet 1

INVENTOR
Culler D. Knowlton
By his Attorney,
Harlow M. Davis

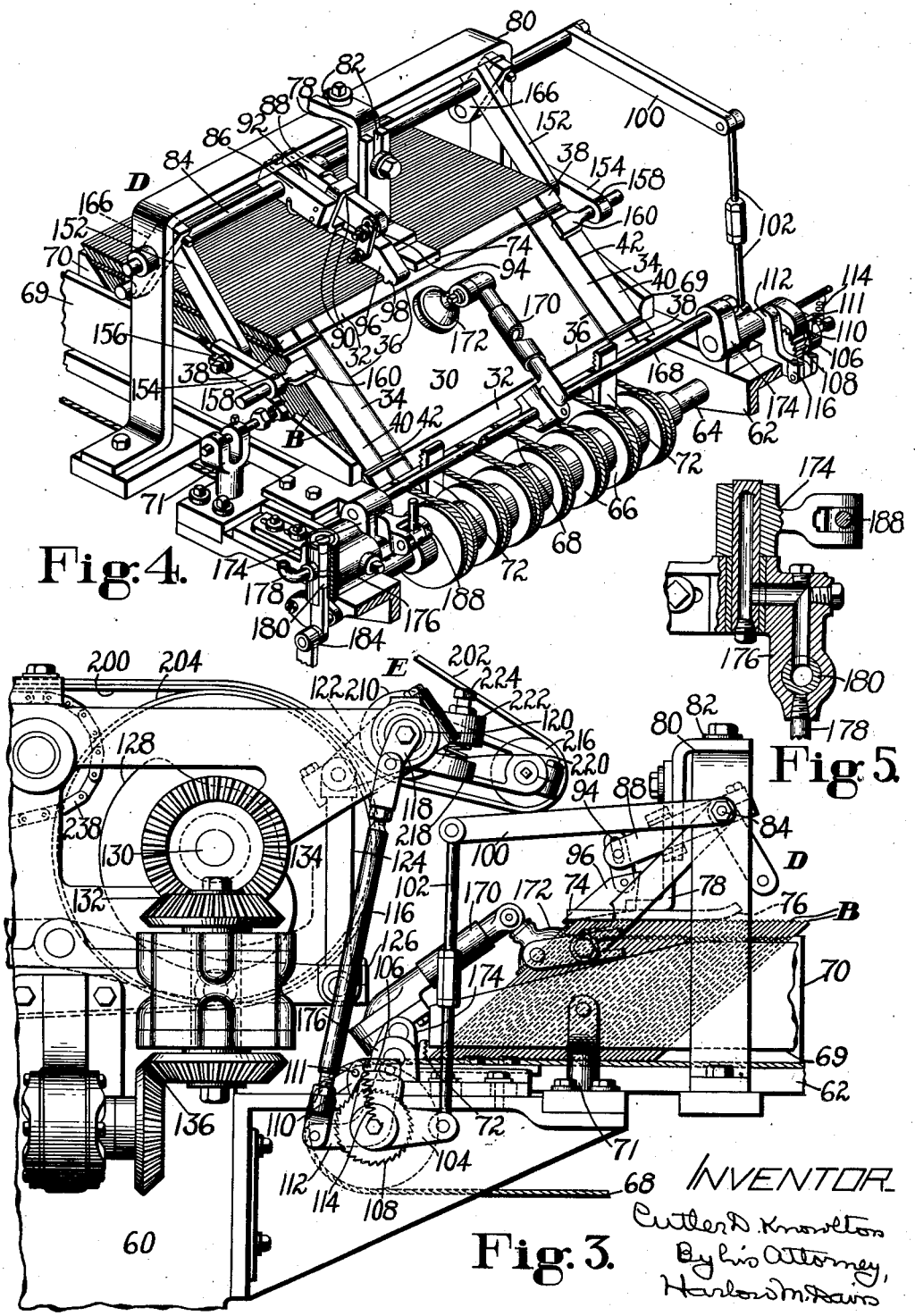

Patented June 7, 1938

2,119,585

UNITED STATES PATENT OFFICE 2,119,585

FEEDING APPARATUS

Cutler D. Knowlton, Beverly, Mass., assignor to Hoague-Sprague Corporation, Lynn, Mass., a corporation of Massachusetts Original application July 7, 1930, Serial No. 465,941. Divided and this application March 13, 1934, Serial No. 715,330

49 Claims. (Cl. 271—28)

This invention relates to apparatus for feeding such sheet-material as blanks to mechanism which is to operate upon them. It is herein disclosed as utilized for supplying blanks to means for setting them up in box-form. The present application is a division of the application filed in my name in the United States Patent Office on July 7, 1930, for improvements in Box-Making, this having the Serial No. 465,941, and which on January 22, 1935, became Patent No. 1,988,452.

An object of the invention involves the correct support of the blanks and their presentation in a novel manner to mechanism which is to advance them to be operated upon. For this purpose, there is employed as a holder in the illustrated apparatus, an endless or other movable conveyor, upon which blanks are supported in a series for transfer to delivering means. The blanks are shown as positioned with reference to transferring mechanism by being forced, in the travel of the conveyor, against a stop. In addition to thus locating the forward blank, the upper edges of the series may be so positioned, by such means as a guide-bar extending above them, as to facilitate their transfer. The advance of the conveyor is preferably controlled by one or more feelers, keeping the forward blank in the proper position for transfer. The actuating connection between the feeler or other controlling means and the advancing means or conveyor, as herein illustrated, includes ratchet mechanism. To relieve the adhesion between the blanks, there is means, which may be furnished by the feeler mechanism, to cause them to buckle and thus more readily separate, and this may be made more effective by applying the buckling action a plurality of times to each blank and in a plurality of directions.

A further object of the invention is to transfer the blanks with certainty successively from the series for their further advance. To this end, I combine with means, which I have shown as a pivoted suction-arm acting directly upon the blanks supported in the series, two belts, one traveling about fixed axes and the other about axes one of which is movable. There is thus formed in one of the belts an oscillating end-portion, which wraps itself about succeeding blanks and forces them into firm engagement with the associated belt which travels over a curved member furnished by a supporting pulley. The belts preferably deliver to a conveyor and have two portions—that which oscillates, as just indicated, and another portion which extends at an angle to the supported series of blanks, and another portion which receives the blanks from the oscillating portion and is alined with and delivers to the forwarding conveyor.

One of the many forms which my invention may take is illustrated in the accompanying drawings. In these, Fig. 1 is a top plan view of my improved feeding apparatus;

Fig. 3 is an enlarged broken side elevation of portions of the blank-holding and transferring mechanisms;

Figure 1:
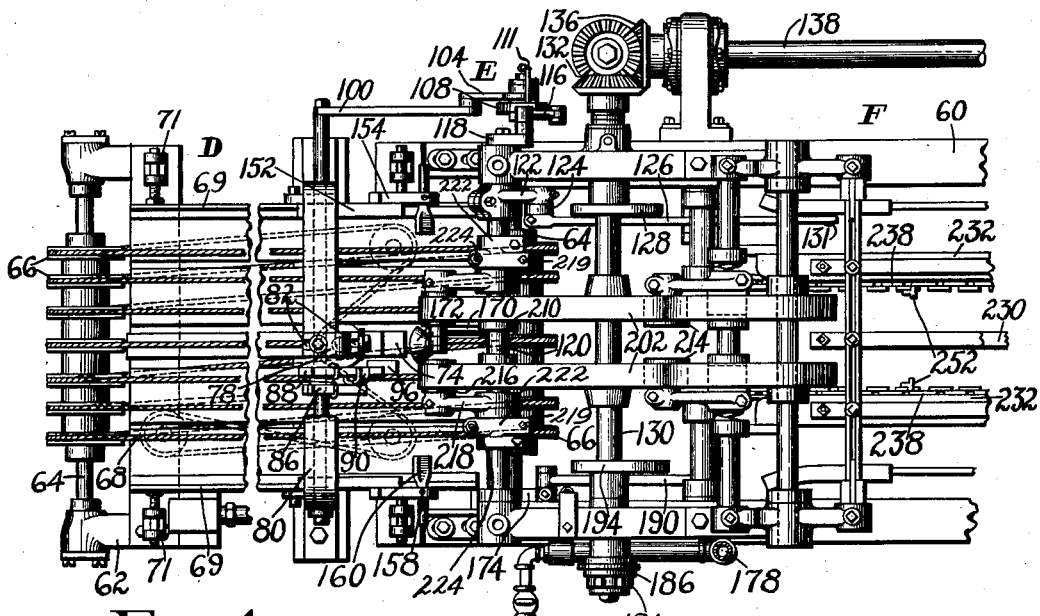

Fig. 4, a perspective view of a portion of the mechanisms of Fig. 3; and

Fig. 5 illustrates in section the suction-connections for the transferring device.

The blank upon which the apparatus disclosed is intended to operate, and which may be for the production of box-covers, is shown at B in Fig. 4 of the drawings. It may consist of shell-material of pasteboard or the like, provided, if desirable, with an outer layer of cover-paper and an inner layer of lining-paper adhesively secured to the shell. This blank has a main or body-portion 30, rectangular in its general form and having at its longer edges side-wings 32, and at its shorter edges end-wings 34, the connection of both sets of wings to the body being defined by creases 36. Projecting from the ends of each side-wing are corner-laps 38, 38, while each end-wing has an extension 40. Between the side-wings and corner-laps are extensions of the end-creases 36, and between the end-wings and their extensions are creases 42.

Figure 2:
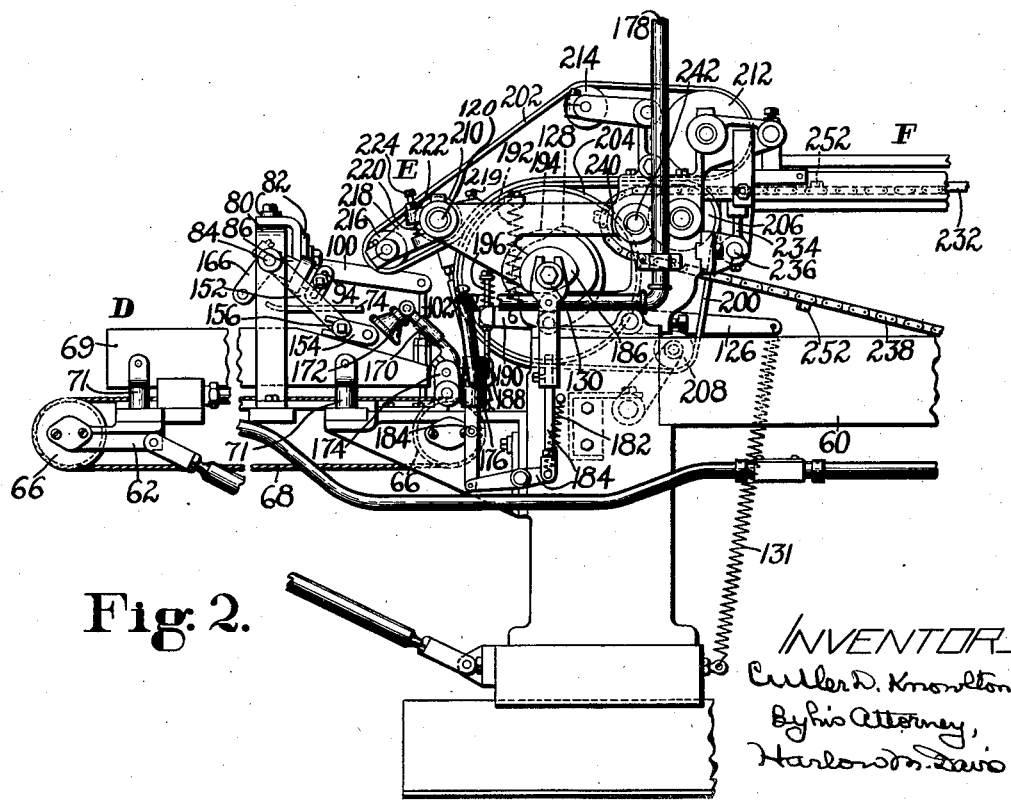
Fig. 2 shows the apparatus in side elevation.

In the production of the cover, the blank B comes successively under the influence of a series of mechanisms situated at different operating positions. Mechanism D (Fig. 2) furnishes a magazine or means for holding a stack or series of the blanks and for delivering the terminal blank to transferring mechanism at E. The mechanism at E takes the blanks one by one from the series and transfers them to conveying means of a delivering section F located at a higher level than the holder D.

The main frame 60 of the machine has, at the entering end, an extension 62, at the opposite extremities of which are journaled horizontal shafts 64, 64 having fixed upon them grooved pulleys 66 spaced regularly from one another. Over the opposite series of pulleys passes a conveyor 68 of the blank-magazine D, which conveyor may consist of an endless rope. The conveyor 68 supports a series of the blanks B, the rear blank resting in a rearwardly and upwardly inclined position against an abutment member 70 carried by the conveyor. At the sides of the conveyor, the blanks are positioned by adjustable edge-gages 69, 69 extending between brackets 71. The lower forward edge of the leading blank is limited in its advance, under the influence of the conveyor, by stops 72 projecting vertically from the frame-extension 62 adjacent to the transferring section E. Above and parallel to the conveyor 68 is a horizontal guide-bar 74, with an upwardly inclined end 76 furnishing an entrance-throat. This maintains the upper edges of the blanks at a substantially constant level. The bar is mounted upon a sectional bracket 78 depending from a bridge 80, the bracket preferably having slot-and-screw connections 82 to the bridge and between its sections, so the relation of the blank-engaging surface of the guide-bar to the conveyor may be adjusted both horizontally and vertically.

It is desirable to maintain the leading blank of the series in an approximately constant plane, to facilitate its proper removal by mechanism E which transfers the blanks to conveying or delivering mechanism F. This is effected by control of the operating mechanism for the conveyor 68 by means acted upon by the blanks. Because of different conditions attending the blanks, as the character and extent of the cover- and lining-paper applied to them, they may be curved longitudinally, or about a transverse axis, with the leading side of the blank either convex or concave. In the first instance, the central portions of the side-wings will be in advance of the end-wings; in the second, the end-wings will lead. To bring a portion of the blank-body near its center to a mean position, which will be approximately the same for all blanks, blank-engaging members of the controlling means are arranged for contact with both the top and the ends of the foremost blank. Journaled in the uprights of the bridge is a carrier shaft or spindle 84, having fixed to it, near its center, an arm 86. Adjacent to this, and loose upon the shaft, is an arm 88, free to play between lower and upper stop-projections 90, 90 from the arm 86. A spring 92 holds the arm 88 normally against the lower projection. Fixed to the forward extremity of the arm 88, for vertical and angular adjustment by a slot-and-screw connection 94, is a finger 96 provided with an end 98 lying somewhat below the blank-engaging surface of the bar 74. Upon one end of the shaft 84 is secured an arm 100, joined by a connecting-rod 102, adjustable as to length, to a bell-crank lever 104 fulcrumed upon the forward shaft 64 of the conveyor. A vertical arm of the lever has an arcuate end 106, serving as a shield for a ratchet-wheel 108 fast upon the shaft 64. Co-operating with the ratchet-wheel is a pawl 110 pivoted upon a lever 112 mounted to oscillate about the shaft 64. A projection 111 from the side of the pawl may receive the contact of and be lifted by the end 106 of the lever 104. The pawl is held normally against the wheel by a spring 114, and is oscillated through a connecting-rod 116 joined to the lever 112 and to an arm 118 fixed to a shaft 120 journaled horizontally at the top of the frame. A second arm 122 on this shaft is united by a connecting-rod 124 to a lever 126 fulcrumed in a lower plane, the lever being oscillated by a cam 128 upon a shaft 130 journaled across the rear end of the main frame 60. A spring 131, connected to the lever, maintains its co-operation with the cam.

From the shaft 130, the chain of driving elements runs through bevel-gearing 132, a vertical shaft 134, bevel-gearing 136, a horizontal line-shaft 138. The shaft 84 also has secured to it, at points above the outer edges of the blanks, arms 152, 152, each provided with an end-section 154 adjustable by slot-and-screw connections 156. Extending horizontally from these end-sections, and adjustable as to their longitudinal extension by set-screws 158, are fingers 160 lying in the path of the ends of the blanks.

The operation of the stack-controlling mechanism is as follows: Until the foremost blank reaches and moves either the finger 96 or the fingers 160 to a predetermined extent, the weight of these fingers and the elements movable with them so holds the lever 104 that the shield-portion 106 is removed from the projection 111, thus allowing the pawl 110 to engage the teeth of the ratchet-wheel 108. Consequently, the continuous oscillation of the lever 112 rotates the shaft 64 steadily and gradually advances the stack of blanks toward the transferring mechanism E. If the blanks are laterally convexed, the upper central portion of the forward blank will reach the finger 96 before the ends contact with the fingers 160, and will force said finger 96 up. This, through the intermediate connections, shifts the shield 106 until its contact with the projection 111 raises the pawl from the ratchet-wheel. The movement of the conveyor 68 therefore ceases, the forward blank of the stack resting against the stops 72. If the curvature of the blanks is opposite, with the concave side forward, the ends will act similarly through the fingers 160. In either case, a feed of the stack is maintained until that area of the body-portion 30 of the blank which is to be engaged by the transferring mechanism is in the desired position, and this relation will be automatically maintained. After a certain angular displacement of the arms 86 and 152 by the forward blank, the movement of the fingers will be arrested by projections from arms 166 fixed to the shaft 84 and striking against the bridge-supports. Now the fingers 160, and to some extent the yieldable finger 96, will resist the advance of the blank-edges by the transferring mechanism, causing said blank to buckle and thus altering its curvature. This admits air between the blank acted upon and that succeeding it in the stack, and breaks the adhesion due to atmospheric pressure. The removal of a plurality of the blanks at one time is thus guarded against. This separating effect may be increased by dividing the end 98 of the finger 96, as appears in Fig. 4. As the edge of a blank passes beneath the multiple projections, they produce repeated impacts, this increasing the efficiency of the adhesion-breaking means.

Considering now the transferring mechanism E, there is mounted to swing in front of the stops 72, a pipe 168 bearing near its center a tubular arm 170, which carries a suction-nozzle 172, adjustable as to angle upon the arm and preferably formed of rubber or other yieldable material. The pipe is secured in arms 174, 174 pivoted upon the frame, the pivot of one of these arms being tubular and communicating with a casing 176, to which suction is applied through a pipe 178. The axis about which the arms turn is in close proximity to, or may be made to coincide with, the lower edge of the forward blank B to be transferred as it rests against the stops 72. Associated with the casing is a valve 180 operated at appropriate times, against the force of a spring 182, by connections 184 acted upon by a cam 186 rotated by the shaft 130. The pipe 168 and its arm 170 are rocked between a blank-removing position at the stack and a blank-delivering position by a rod 188 joined to one of the arms 174 and passing through an opening in a lever 190 fulcrumed about the same center as the lever 126 and urged by a spring 192 into co-operation with a cam 194 upon the shaft 130. In the movement of the lever which causes the engagement of the nozzle with the blank, the force is transmitted through a spring 196 surrounding the rod 188, allowing the nozzle to yield and thus insure firm contact. When the nozzle 172 is thus pressed against the terminal blank upon the conveyor 68, the suction is set up under the control of the valve 180, and the blank is drawn from beneath the feeler-fingers 98 and 160 by forward movement of the arm 170. This delivers the blank upwardly against two spaced endless belts 200, 200, and below oscillating portions of two corresponding belts 202, 202. The pairs of belts 200, 202 are shown as side by side, equally separated at opposite sides of the suction device. Each belt 200 passes about a fixed axis over a large pulley 204 fast upon the cam-shaft 130, and by it is driven horizontally about an idle pulley 206 and down beneath a tightening pulley 208. The belts 202 are preferably not driven, but each is guided in contact with a portion of the opposite belt 200, where it surrounds the pulley 204, by a roll 210 turning about the shaft 120, and continues horizontally with said belt over a guide-pulley 212, and then about a tightening pulley 214 and an oscillatory pulley 216. Movement of the angular receiving ends of the belts 202 by the pulleys 216 produces a grasping of the blank between said belts and the belts 200 and its removal from the suction device. Each pulley 216 is rotatable upon an arm 218 carried by the shaft 120. When each arm is oscillated by the shaft under the influence of the cam 128, it is capable of yielding as its belt 202 contacts with the blank, it having a limited angular movement from a position determined by a screw 219 threaded through an arm 222 fast upon the shaft and with which the arm 218 contacts. This movement is against the resistance of a spring 220 interposed between each pair of arms 218 and 222. The resistance of the spring, and thus the degree of pressure of the belt upon the blank, may be varied by a second screw 224 threaded in the arm 222, and against which the spring abuts. As the suction device 172 brings the upper edge of the blank which it engages against the belts 200, the arms 218 descend and force the belts 202 against its outer side, wrapping said belts about it. This produces a variation in the area of contact between belts 200 and 202 and the blanks, the entrance-space, which first forms a relatively wide receiving throat, being reduced and there resulting a more effective advancing force upon the blanks as the contact-area increases. At this time, the suction is cut off by the valve 180, and thereafter the device 172 returns to the stack to transfer the succeeding blank therefrom. As soon as both the pairs of belts 200, 200 and 202, 202 have grasped the forward extremities of the blank, they feed it forward between those portions which are in constant contact. This permits the arms 218 to restore the oscillatory ends of the belts 202 to their initial relation, ready to act upon the next blank. During the movement of the blank by the suction device, its lower edge is displaced but slightly, if at all, from the conveyor 68, said blank substantially turning about this edge as an axis. Therefore, there is no opportunity for angular displacement of the blank upon the head 172. The initial movement of one edge only of the blank also better breaks its adhesion to the succeeding blank.

When the transferred blank leaves the section E with what is to be the outside or top of the cover upmost, it enters the conveying section F. Here, the blank is received upon horizontal supporting rails 230, 232, 232, the first of these extending longitudinally of the center of the frame 60 and the other two being equally spaced at each side (Fig. 1). Brackets 234 support the rails, these brackets being fixed by set-screws to transverse rods 236. This mounting permits the rails to be adjusted to different points across the frame to best adapt them for the support of different sizes of blanks. Along these rails the blanks are advanced by chains 238 of the mechanism F which delivers to the operating means, these chains traveling at the inner sides of the rails 232 and having outwardly projecting blank-engaging lugs 252. The chains operate over pairs of sprocket-wheels 240, 240 secured to horizontal shafts 242, 242 journaled in the frame 60.

Having described the invention, what I claim as new and desire to secure by Letters Patent of the United States is:

1. In combination, means for delivering blanks, a movable conveyor upon which a series of blanks may be supported, oscillatory means for transferring blanks from the conveyor to the delivering means, and a stop situated in approximate coincidence with the axis of oscillation of the transferring means at the surface of the conveyor and against which the blanks are forced by said conveyor, said blanks being turned substantially about such axis by the transferring means.

2. In combination, means for delivering blanks, an endless traveling conveyor situated at a lower level than the delivery means and upon which a series of blanks may be supported upon their edges, a curved member toward which the forward blank of the series upon said conveyor is advanced, means for engaging the forward blank upon the conveyor and moving its upper edge against the curved member, and means for engaging the thus moved blank and transferring it over the curved member to the delivery means.

3. In combination, means for delivering blanks, an endless conveyor traveling horizontally on a lower level than the delivering means and upon which a series of blanks may be supported, a stop situated at one extremity of the conveyor and against which the blanks of the series are successively forced by said conveyor, and suction means and opposite contacting belts located at the same end of the conveyor as the stop and movable to transfer successively the forward blank of the series forwardly and upwardly from the stop to the delivering means.

4. In combination, a substantially horizontal delivering conveyor, a substantially horizontal magazine conveyor arranged to support a series of blanks upon their edges, an oscillatory blank-transferring belt movable between the conveyors, and an oscillatory suction-nozzle engaging the forward blank of the series upon the magazine-conveyor and carrying its upper portion forward to receive the action of the transferring belt.

5. In combination, a substantially horizontal delivering conveyor, a substantially horizontal magazine conveyor arranged to support a series of blanks upon their edges at a lower level than the delivering conveyor, means for holding the series upon the magazine-conveyor inclined upwardly and rearwardly from the forward end of said magazine-conveyor and a transferring device pivoted adjacent to the blank-supporting conveyor and arranged to oscillate forwardly and upwardly toward the delivering conveyor, said transferring device engaging the upper portions of successive blanks to swing them about their lower edges.

6. In combination, a substantially horizontal delivering conveyor, a substantially horizontal conveyor arranged to support a series of blanks upon their edges at a lower level than the delivering conveyor, a stop situated at the forward end of the lower conveyor, a transferring device pivoted adjacent to the stop, means for oscillating the device about an axis in approximate coincidence with the stop from a point of engagement with a blank contacting with the stop forwardly and upwardly toward the delivering conveyor, and a second transferring device having an oscillatory portion receiving the blank from the first device and transferring it to the delivering conveyor.

7. In combination, means for delivering blanks, an endless conveyor upon which a series of blanks may be supported, a pneumatic suction device movable from engagement with a blank upon the conveyor toward the delivering means, and opposite contacting belts receiving the blanks from the suction device and transferring them to the delivering means, one of said belts presenting a curved surface and the other belt being movable to bend the received blank over the curved surface of the companion belt.

8. In combination, a substantially horizontal upper delivering conveyor, a substantially horizontal conveyor arranged to support a series of blanks upon their edges, a tubular arm pivoted adjacent to the forward end of the blank-supporting conveyor and approximately at the level of its blank-supporting surface, said arm having a blank-engaging head, means for producing a suction through the arm and head, and means for swinging the arm forwardly and upwardly to transfer the engaged blank from the lower to the upper conveyor.

9. In combination, means for delivering blanks, an endless conveyor upon which a series of blanks may be supported upon their edges, means for transferring blanks from the conveyor to the delivering means, and means extending in contact with the upper edges of the series of blanks for maintaining said edges at a substantially constant height above the conveyor in preparation for the engagement of the blanks by the transferring means.

10. In combination, means for delivering blanks, an endless conveyor upon which a series of blanks may be supported upon their edges, and a guide-bar extending above the series of blanks substantially parallel to the conveyor and in contact with the upper edges of said blanks.

11. In combination, means for delivering blanks, an endless conveyor upon which a series of blanks may be supported upon their edges, means for transferring blanks from the conveyor to the delivering means, means for maintaining the upper edges of the series of blanks at a substantially constant height above the conveyor in preparation for their engagement by the transferring means, and means arranged to vary and fix against change the relation of the height-maintaining means to the conveyor.

12. In combination, means for delivering blanks, a conveyor upon which a series of blanks may be supported upon their edges, a guide-bar extending above the series of blanks substantially parallel to the conveyor, and means arranged to vary the position of the guide-bar longitudinally of the series and toward and from said series.

13. In combination, means for delivering blanks, a conveyor upon which a series of blanks may be supported, means for transferring blanks from the conveyor to the delivering means, a guide-bar extending above the series of blanks, and means arranged to vary the relation of the guide-bar to the point of engagement of the transferring means with the forward blank.

14. In combination, a substantially horizontal delivering conveyor, a substantially horizontal conveyor arranged to support a series of blanks upon their edges, oscillatory blank-transferring means movable between the conveyors, a guide-bar extending above the series of blanks substantially parallel to the blank-supporting conveyor, means arranged to vary the relation of the bar to such conveyor, and means arranged to vary the relation of the forward extremity of the bar to the transferring device.

15. In combination, an endless conveyor upon which a series of blanks may be supported, means for advancing the conveyor and series of blanks, means having members contacting with the blanks at opposite edges to control the advancing means, said members being secured to move together, and means for drawing the leading blank of the series forward from the conveyor between the members.

16. In combination, a movable conveyor upon which a series of blanks may be supported, unitary means for advancing the conveyor and series of blanks, and members contacting with the blanks at the opposite sides of the conveyor and at a point between said sides, all of the members being arranged to control the unitary advancing means.

17. In combination, a movable support for a series of blanks having side-wings and end-wings, the end-wings lying at opposite sides of the path of movement, means for delivering blanks from the support, means for moving the support in preparation for the delivery, feelers projecting from opposite sides of the support over the end-wings of a blank, and controlling connections between both feelers and the moving means.

18. In combination, a movable support for a series of blanks having side-wings and end-wings, means for delivering blanks from the support, means for moving the support in preparation for the delivery, feelers contacting with opposite end-wings of a blank, a feeler contacting with a side-wing, and controlling connections between the feelers and moving means.

19. In combination, an endless conveyor upon which a series of blanks may be supported, means for advancing the conveyor and series of blanks, a movable carrier, a plurality of feelers contacting with the forward blank of the series, certain of said feelers being yieldable upon the carrier and the others fast thereon, and controlling connections between the feelers and advancing means.

20. In combination, a movable support for blanks arranged in a series upon their edges, means for moving the support in a substantially horizontal direction, a feeler contacting with the edges of the blanks opposite the support, and a guide for the edges of the blanks adjacent to the feeler.

21. In combination, an endless conveyor upon which a series of blanks may be supported, means for advancing the conveyor and series of blanks, a spindle extending above the conveyor, a plurality of feeler-fingers secured against movement upon the spindle and projecting from each side of the conveyor for contact with the opposite extremities of the blanks, and controlling connections between the spindle and advancing means.

22. In combination, an endless conveyor upon which a series of blanks may be supported, unitary means for advancing the conveyor and series of blanks, a spindle extending above the conveyor, a plurality of feeler-fingers carried by the spindle for contact with the blanks, one of said fingers being yieldable upon the spindle, and controlling connections between the spindle and the unitary advancing means.

23. In combination, an endless conveyor upon which a series of blanks may be supported, unitary means for advancing the conveyor and series of blanks, a spindle extending above the conveyor, a plurality of feeler-fingers carried by the spindle at opposite sides of the conveyor, a feeler-finger carried by the spindle between the side-fingers, and controlling connections between the spindle and the unitary advancing means.

24. In combination, an endless conveyor upon which a series of blanks may be supported, unitary means for advancing the conveyor and series of blanks, a spindle extending above the conveyor, a plurality of feeler-fingers carried by the spindle at opposite sides of the conveyor, a feeler-finger carried by the spindle between the side-fingers, the intermediate finger being yieldable upon the spindle, and controlling connections between the spindle and the unitary advancing means.

25. In combination, an endless conveyor upon which a series of blanks may be supported, a ratchet-wheel and oscillatory pawl for advancing the conveyor and series of blanks, a plurality of feelers contacting with the blanks upon the conveyor, one of said feelers being yieldable, and connections to all the feelers for moving the pawl.

26. In combination, a movable support for blanks to be formed, means for transferring the blanks from the support, means for moving the support, controlling means for the moving means movable by contact with the blanks, and connections through which movement of the controlling means is transmitted to the moving means, said controlling means including members engaging and causing the blanks to buckle during their removal from the support.

27. In combination, a movable support for blanks to be formed, means for transferring the blanks from the support, means for moving the support, spaced feelers contacting with the blanks upon the support, the passage of the blanks through the space between the feelers causing said blanks to buckle, and controlling connections between the feelers and moving means.

28. In combination, a movable support for blanks to be formed, means for transferring the blanks from the support, means for moving the support, and controlling means for the moving means governed by contact with the blanks, said controlling means including a plurality of projections contacting successively with each blank during its removal from the support.

29. In combination, a movable support for a series of blanks, means for moving the support, means for transferring the blanks from the support, a feeler finger provided with a series of projections contacting with each blank during its transfer, and actuating connections between the feeler and moving means.

30. In combination, a support for a series of blanks, means for transferring the blanks from the support and comprising a belt traveling about fixed axes at its opposite extremities, a co-operating belt traveling about axes one of which is movable toward and from the companion belt opposite one of its axes, means for effecting such axial movement and thereby varying the extent to which the movable portion surrounds the axis of the companion belt, and means for removing the blanks from the series and placing them between the belts.

31. In combination, a support for a series of blanks, means for transferring the blanks from the support and comprising two co-operating traveling belts one of which has an end-portion oscillating to vary the arc of contact with a curved portion of the companion belt, and means for removing the blanks from the series and positioning them between the belts to receive contact of the oscillatory portion.

32. In combination, a support for a series of blanks, means for transferring the blanks from the support and comprising a pulley, a belt traveling about said pulley, a second belt traveling in contact with the first and having an oscillatory portion movable toward and from the companion belt opposite its pulley, said portion in its oscillation being wrapped over such pulley, and means for removing blanks from the series and positioning them between the belts at the oscillatory portion.

33. In apparatus of the character described, mechanism for supporting and advancing a supply of sheets standing on edge one behind another, means forwardly of and above said mechanism and to which sheets are fed one after another, sheet-conveying means for delivering the sheets upwardly and forwardly to said first named means, and means movable toward and away from the front of said supply for separating the sheets successively therefrom and delivering them in like manner to said sheet-conveying means.

34. In a sheet-feeder, means for supporting and advancing a supply of sheets standing on edge one behind another, mechanism for operating the sheet-supporting and-advancing means, and one or more detector elements rocking across one edge of the supply in engagement with a front marginal portion thereof and controlling the operation of said mechanism and said means.

35. In a sheet-feeder, means for supporting and advancing a supply of sheets standing on edge one behind another, mechanism for operating said means, control means for said mechanism, one or more detector elements rocking across one edge of the supply in engagement with a front marginal portion thereof, and movable devices operated and controlled by said element or elements and controlling the operation of said control means.

36. In a sheet-feeder, means for supporting and advancing a supply of sheets standing on edge one behind another, means for successively separating and forwarding sheets from the front of said supply, mechanism for operating said first-named means, and means controlling the operation of said mechanism and including one or more detector elements rocking across a front marginal portion of the supply in engagement with the foremost sheet thereof.

37. In a sheet-feeder, means for feeding a supply of sheets to be separated one after another, and detector means controlling movement of said first-named means and the supply and movable outside a marginal extremity of said supply as each sheet is separated therefrom.

38. In a sheet-feeder, means for feeding a supply of sheets, and one or more detector devices controlling the movement of said means and the supply and movable outside a marginal extremity of said supply once during each cycle of operation of said feeder.

39. In apparatus of the character described, means to be fed, means for supporting and advancing a supply of sheets standing on edge one after another, and oscillating suction means for separating the sheets one after another from the front of said supply and for delivering them in like manner to said first-named means.

40. In a sheet-feeder, means for supporting and feeding a supply of sheets standing on edge one behind another, and one or more devices for separating sheets from the front of the supply, said device or devices acting to separate only one sheet at a time from the supply and push back any other sheet or sheets displaced forwardly thereof during the cycle of operation of the sheet-separating device or devices.

41. In a sheet-feeder, means for supporting and feeding a supply of sheets standing on edge one behind another, stop means for the front of the supply, and means for separating sheets from the front of the supply, said sheet-separating means acting to separate only one sheet at a time from the supply and push back any other portion thereof advanced past said stop means by said first-named means.

42. In a sheet-feeder, curved means arranged in spaced parallel relation and to convex portions of which a sheet is fed, and means including an oscillating member for separating the sheet from the front of a supply and delivering the sheet to the curved means, at least a portion of said oscillating member moving within the arc of curvature of said curved means upon delivery of the sheet to said convex portions thereof.

43. In a sheet-feeder, driven endless sheet-conveying means arranged in spaced parallel relation and sheet-separating and-forwarding means including a suction tube adapted to deliver a sheet to said sheet-conveying means, at least a portion of the suction-tube being movable past the latter to facilitate advancement of the sheet thereby.

44. In combination, belts adapted to feed material delivered between them, means for delivering material between the belts, and means for moving one of the belts toward and from the other to vary the receiving area of contact between the material and said belts as said material is delivered.

45. In combination, belts adapted to feed material delivered between them, means for delivering material between the belts, and means for moving one of the belts toward and from the other to vary the receiving area of contact between the material and said belts as said material is delivered, said moving means being provided with means whereby the pressure upon the material by the belt moved may be varied.

46. In combination, belts adapted to feed material delivered between them, means for delivering material between the belts, a pulley over which one of the belts travels, means for moving the pulley to gradually force its belt toward the other belt and into varying contact with the material, and means arranged to permit the pulley to yield during the contact of the belt with the material.

47. In combination, belts adapted to feed material delivered between them, means for delivering material between the belts, a pulley over which one of the belts travels, means for moving the pulley to gradually force its belt toward the other belt and into varying contact with the material, means arranged to permit the pulley to yield during the contact of the belt with the material, and means arranged to vary the resistance to such yield.

48. In combination, belts adapted to feed material delivered between them, means for delivering material between the belts, an oscillatory arm, a pulley movable upon the arm and over which one of the belts travels and by which it is moved to vary the area of contact between the belts and the material, and a spring interposed between the pulley and the arm to permit said pulley to yield.

49. In combination, belts adapted to feed material delivered between them, means for delivering material between the belts, an oscillatory arm, a pulley movable upon the arm and over which one of the belts travels and by which it is moved to vary the area of contact between the belts and the material, a spring interposed between the pulley and the arm to permit said pulley to yield, and means for varying the resistance of the spring to compression.

CUTLER D. KNOWLTON.